(12) United States Patent
Tsirkin

(10) Patent No.: US 9,785,378 B2
(45) Date of Patent: Oct. 10, 2017

(54) TRACKING TRANSFORMED MEMORY PAGES IN VIRTUAL MACHINE CHAIN MIGRATION

(71) Applicant: Red Hat Israel, Ltd., Raanana (IL)

(72) Inventor: Michael Tsirkin, Yokeneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 157 days.

(21) Appl. No.: 14/166,498

(22) Filed: Jan. 28, 2014

(65) Prior Publication Data

US 2015/0212839 A1    Jul. 30, 2015

(51) Int. Cl.
*G06F 3/06*    (2006.01)
*G06F 9/455*    (2006.01)

(52) U.S. Cl.
CPC ........ *G06F 3/0655* (2013.01); *G06F 9/45558* (2013.01); *G06F 2009/4557* (2013.01); *G06F 2009/45583* (2013.01)

(58) Field of Classification Search
CPC ............. G06F 9/45558; G06F 9/45533; G06F 2009/4557; G06F 2009/45579
See application file for complete search history.

(56) References Cited

U.S. PATENT DOCUMENTS

| 7,072,919 | B2 |   | 7/2006 | Sexton et al. |
| 8,316,374 | B2 |   | 11/2012 | Lim et al. |
| 8,392,658 | B2 | * | 3/2013 | Wang .................... G06F 12/121 711/118 |
| 8,490,091 | B2 |   | 7/2013 | Bozek et al. |
| 8,549,519 | B2 |   | 10/2013 | Emaru |
| 2009/0113164 | A1 | * | 4/2009 | Rajamony ........... G06F 12/1072 711/202 |
| 2009/0132804 | A1 |   | 5/2009 | Paul et al. |
| 2011/0202765 | A1 |   | 8/2011 | McGrane et al. |
| 2011/0283256 | A1 |   | 11/2011 | Raundahl Gregersen et al. |

(Continued)

OTHER PUBLICATIONS

Svard, Petter, et al., "Evaluation of Delta Compression Techniques for Efficient Live Migration of Large Virtual Machines", Dept. of Computing Science, Umea University; SAP Research CEC Belfast SAP (UK) Limited, University of Ulster, 11 pages http://www.researchgate.net/publication/221137843_Evaluation_of_delta_compression_techniques_for_efficient_live_migration_of_large_virtual_machines.
"Thread: Hypervisor Migration", Knowledge Center, Citrix Systems, Inc., 1999-2013, 2 pages http://forums.citrix.com/thread.jspa?threadID=323422&tstart=270.

(Continued)

*Primary Examiner* — Ryan Bertram
*Assistant Examiner* — Tracy Chan
(74) *Attorney, Agent, or Firm* — Lowenstein Sandler LLP

(57) ABSTRACT

Systems and methods for tracking transformed memory pages in virtual machine chain migration. An example method may comprise: receiving, by a computer system, a transformed memory block comprising one or more memory pages mapped into an address space of a virtual machine being migrated to the computer system; performing a reverse transformation of at least part of the transformed memory block, to produce a memory page comprised by the transformed memory block; storing, in a memory, the memory page; detecting a modification of the memory page by the virtual machine; and, responsive to determining that a number of modified memory pages associated with the transformed memory block exceeds a threshold value, discarding the transformed memory block.

20 Claims, 4 Drawing Sheets

(56) References Cited

U.S. PATENT DOCUMENTS

| | | | |
|---|---|---|---|
| 2011/0302577 A1 | 12/2011 | Reuther et al. | |
| 2012/0023494 A1 | 1/2012 | Harrison et al. | |
| 2012/0221744 A1* | 8/2012 | Heywood | G06F 9/4862 709/247 |
| 2012/0311569 A1 | 12/2012 | Shah | |
| 2013/0073823 A1* | 3/2013 | Hunter | G06F 9/45533 711/162 |
| 2013/0097392 A1 | 4/2013 | Arges et al. | |
| 2013/0139155 A1 | 5/2013 | Shah | |
| 2013/0151846 A1 | 6/2013 | Baumann et al. | |
| 2013/0191648 A1 | 7/2013 | Bursell | |
| 2013/0227551 A1 | 8/2013 | Tsirkin | |
| 2014/0052926 A1* | 2/2014 | Devendran | G06F 12/1009 711/136 |

OTHER PUBLICATIONS

Chiang, Jui-Hao "Optimization Techniques for Memory Virtualization-based Resource Management", Stony Brook University, Dec. 2012 152 Pages.

Tsirkin, Michael "Lazy Memory Transformation in Virtual Machine Live Migration", U.S. Appl. No. 14/166,533, filed Jan. 28, 2014.

USPTO Office Action for Application No. 14/166,533, mailed Sep. 9, 2015.

What is Elastic Memory for Java?, VMware, Inc. http://pubs.vmware.com/vfabric5/index.jsp?topic=/com.vmware.vfabric.tc-server.2.6/em4j/em4j-about.html, last accessed Oct. 16, 2013.

Zhang, Irene et al., "Optimizing VM Checkpointing for Restore Performance in VMware ESXi", University of Washington; MIT CSAIL; VMware; CloudPhysics; 12 Pages.

USPTO, Office Action for U.S. Appl. No. 14/166,533, mailed Dec. 31, 2015.

* cited by examiner

TRACKING TRANSFORMED MEMORY PAGES IN VIRTUAL MACHINE CHAIN MIGRATION

TECHNICAL FIELD

The present disclosure is generally related to virtualized computer systems, and is more specifically related to systems and methods for virtual machine live migration.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
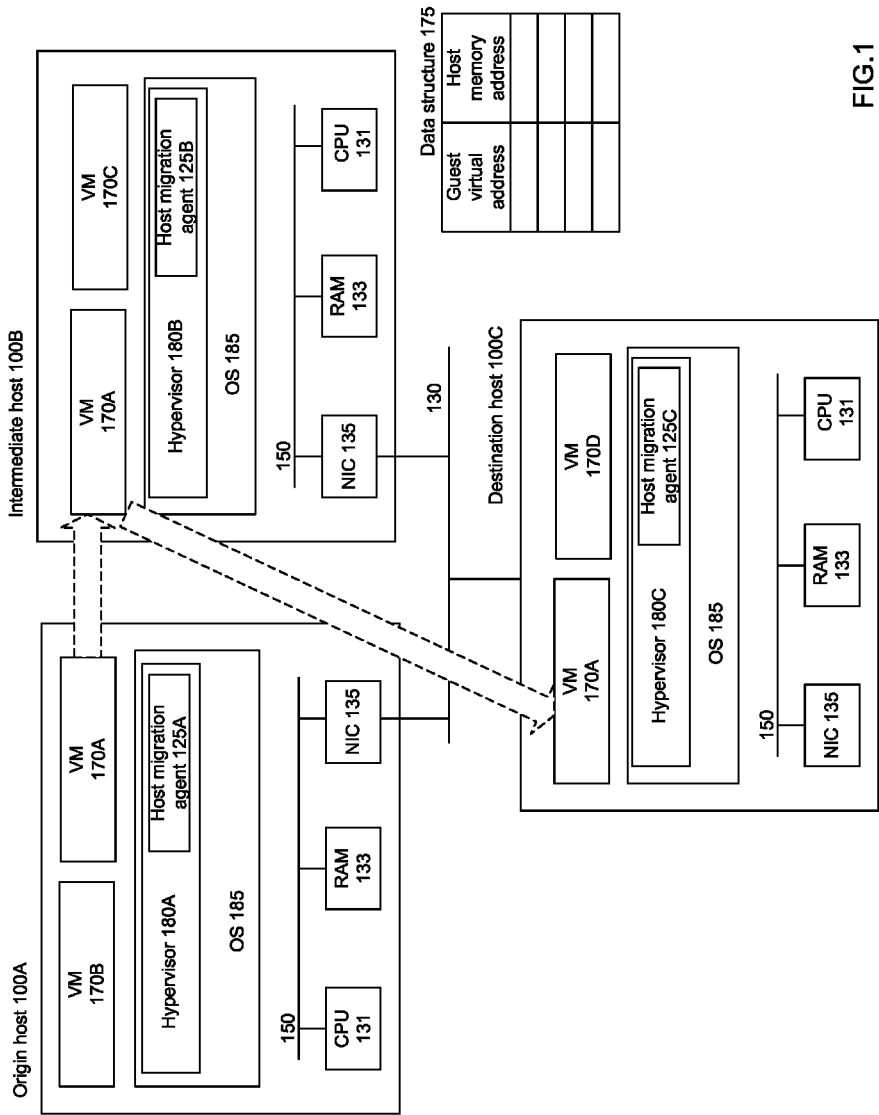
FIG. 1 schematically illustrates a high-level component diagram of one illustrative embodiment of a distributed computer system, in accordance with one or more aspects of the present disclosure.

Described herein are methods and systems for tracking transformed memory pages in virtual machine chain migration. "Memory transformation" herein shall refer to applying one or more transformation methods, including compression, encryption, and/or encoding, to a memory block comprising one or more memory pages.

"Live migration" herein shall refer to the process of moving a running virtual machine from an origin host computer system to a destination host computer system without disrupting the guest operating system and the applications executed by the virtual machine. Live migration may involve copying the virtual machine execution state from the origin host to the destination host. The virtual machine execution state may comprise the memory state, the virtual processor state, the virtual devices state, and/or the network connectivity state.

Hence, the destination hypervisor may receive the virtual machine execution state over the network and store the execution state into the host memory mapped into the virtual machine address space. In an illustrative example, memory blocks comprised by the virtual machine execution states may be transformed before being transmitted over the network to the destination host.

"Transformed memory block" herein shall refer to a plurality of memory pages to which a transformation function has been applied. Examples of transformation functions include compression, encryption, and/or encoding. For each transformation function, a corresponding reverse transformation function may be defined (e.g., de-compression, decryption, and/or decoding).

"Chain migration" herein shall refer to migration of a virtual machine from a first host computer system to a second host computer system followed by migration to a third computer system.

In conventional systems, responsive to receiving a transformed memory block from host A, the host migration agent of host B would immediately reverse the transformation to produce one or more untransformed memory pages, map the memory pages into the virtual machine address space, and discard the transformed memory blocks. In a chain migration scenario, in a subsequent virtual machine migration to host C, the host migration agent B would need to perform the transformations of all memory pages comprised by the virtual machine execution state, irrespectively of whether those have been modified by the virtual machine at host B.

The above described transformation operations performed by host B may be superfluous with respect to the memory pages that have not been modified by the virtual machine while the latter was running on host B. Hence, in accordance with one or more aspects of the present invention, the overall processing efficiency as well as the amount of data transmitted over the network by host B may be optimized by excluding the superfluous reverse transformation, memory mapping, and network transmission operations through tracking the access to the memory pages by the virtual machine, as described in more details herein below.

In an illustrative example, responsive to receiving, from host A, a transformed memory block comprising one or more virtual machine memory pages, the hypervisor running on host B may store in the host memory one or more mappings of the memory page address (e.g., represented by a host memory address or a guest memory address) to the identifier of the transformed memory block stored in the host memory, without performing the reverse transformation of the transformed memory block. Later, when a memory page comprised by the transformed memory block is accessed by the virtual machine, the hypervisor may intercept the memory page access attempt, perform the reverse transformation of at least part of the transformed memory block containing the memory page, and store the memory page into a memory location mapped into the virtual machine address space, as described in more details herein below.

The hypervisor may track memory page modifications by the virtual machines. Upon determining that the number of modified memory pages belonging to a particular transformed memory block exceeds a pre-determined or dynamically determined threshold value, the hypervisor may discard the transformed memory block.

When the virtual machine is later migrated to host C, the hypervisor running on host B may first transmit to host C the remaining transformed memory blocks of the plurality of transformed memory blocks, and then transmit the modified memory pages. Various aspects of the above referenced methods and systems are described in details herein below by way of examples, rather than by way of limitation.

FIG. 1 depicts a high-level component diagram of one illustrative example of a distributed computer system in accordance with one or more aspects of the present disclosure. "Computer system" herein shall refer to a system comprising one or more processors, one or more memory devices, and one or more input/output (I/O) interfaces. A distributed computer system may comprise one or more computer systems interconnected by one or more networks.

Computer system 100A, 100B may be interconnected, via a network 130, with one or more remote computers. Computer system 100A, 100B may comprise one or more processors 131 communicatively coupled to a memory device 133 and a network interface controller (NIC) 135. Local connections within host computer system 100A, 100B, including connections between processor 131, memory device 133, and NIC 135, may be provided by one or more local buses 150 of a suitable architecture.

"Physical processor" or "processor" herein shall refer to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data.

In an illustrative example, as schematically illustrated by FIG. 1, computer system 100 may run multiple virtual machines 170 by executing a software layer 180, often referred to as "hypervisor," above the hardware and below the virtual machines. In certain implementations, hypervisor 180 may be a component of operating system 185 executed by host computer system 100. Alternatively, hypervisor 180 may be provided by an application running under host operating system 185, or may run directly on the host computer system 100 without an operating system beneath it. Hypervisor 180 may abstract the physical layer, including processors, memory, and I/O devices, and present this abstraction to virtual machines 170 as virtual devices, including virtual processors, virtual memory, and virtual I/O devices. Host migration agents 125A, 125B, and/or 125C running on host computer system 100A, 100B, and 100C, respectively, may perform virtual machine migration management functions in accordance with one or more aspects of the present disclosure. In certain implementations, a host migration agent may be implemented as a software component invoked by hypervisor 180. Alternatively, functions of host migration agent 125 may be performed by hypervisor 180.

The address space virtualization may be handled through the paging mechanism designed to implement a virtual machine address space with a smaller amount of random access memory (RAM) and some backing store. The memory may be divided into pages of a defined size (e.g., 4 KB) which may be stored either in RAM or on the disk. The host operating system may maintain a page directory and a set of page tables to keep virtual to physical address mappings. When a virtual machine attempts to access a memory page, the processor may use the page directory and page tables to translate the virtual address into a physical address. If the page being accessed is not currently in the physical memory, the processor may generate a page-fault exception, responsive to which the host operating system may then read the page from the backing store into the physical memory and continue executing the thread.

"Page table" herein shall refer to a memory structure facilitating translation of virtual memory addresses to physical memory addresses. In an illustrative example, a page table maintained by a host computer system may include a plurality of page table entries corresponding to a plurality of memory pages mapped into the address space of a virtual machine running on the host computer system. Each page table entry may represent a mapping of a virtual address of a memory page to the physical address of a corresponding physical frame. In certain implementations, each page table entry may comprise a valid bit indicating whether the memory page is currently present in the physical memory frame referenced by the corresponding page table entry. Each page table entry may further comprise a writable bit indicating whether the write access to the memory page is allowed.

In an illustrative example, virtual machine 170A may be undergoing chain migration from origin host computer system 100A to host computer system 100B, and then to host computer system 100C, as schematically illustrated by FIG. 1. Live migration may involve copying the virtual machine execution state from an origin host to a destination host (e.g., from host A to host B or from host B to host C). The virtual machine execution state may comprise the memory state, the virtual processor state, the virtual devices state, and/or the connectivity state. Host migration agents 125 may manage copying, over network 130, the execution state of migrating virtual machine 170A, including a plurality of memory blocks, from origin host 100A to host 100B while virtual machine 170A is still running on origin host 100A, and then from host 100B to host 100C while virtual machine 170A is still running on host 100B. In an illustrative example, memory blocks comprised by the virtual machine execution states may be transformed (e.g., compressed, encrypted, and/or encoded) before being transmitted over the network to the destination host.

A memory block may comprise one or more conventional, "large" or "huge" memory pages. "Large" or "huge" memory page refers to a memory page having the size larger than that of a conventional memory page for a given combination of processor architecture and operating system. In certain implementations, the virtual machine migration methods described herein may operate with memory blocks of one or more fixed sizes and/or variable sizes. In an illustrative example, a memory block may comprise two or more memory pages corresponding to a contiguous memory address range.

To exclude redundant memory transformations by host 120B with respect to memory pages which may never be accessed by a virtual machine, host computer system 120B may implement lazy memory transformation with respect to the incoming memory blocks. In an illustrative example, host migration agent 125B running on host computer system 100B may receive, from origin host computer system 100A, one or more transformed memory blocks, each comprising one or more virtual machine memory pages.

Responsive to receiving a transformed memory block, the destination host migration agent may store the transformed memory block in the host memory without performing the reverse transformation. The destination host migration agent may further store, in a memory data structure 175, for each memory page contained by the transformed memory block, a mapping of the memory page address to the identifier of the transformed memory block stored in the host memory. In certain implementations, the destination host migration agent may further clear the valid bit of the page table entry corresponding to the virtual memory page, so that an attempt to access the memory page would trigger a page fault which may be intercepted by the hypervisor. Alternatively, the destination host migration agent may further clear the writable bit of the page table entry corresponding to the virtual memory page, so that an attempt to access the memory page would trigger a memory protection fault which may be intercepted by the hypervisor.

Figure 2:
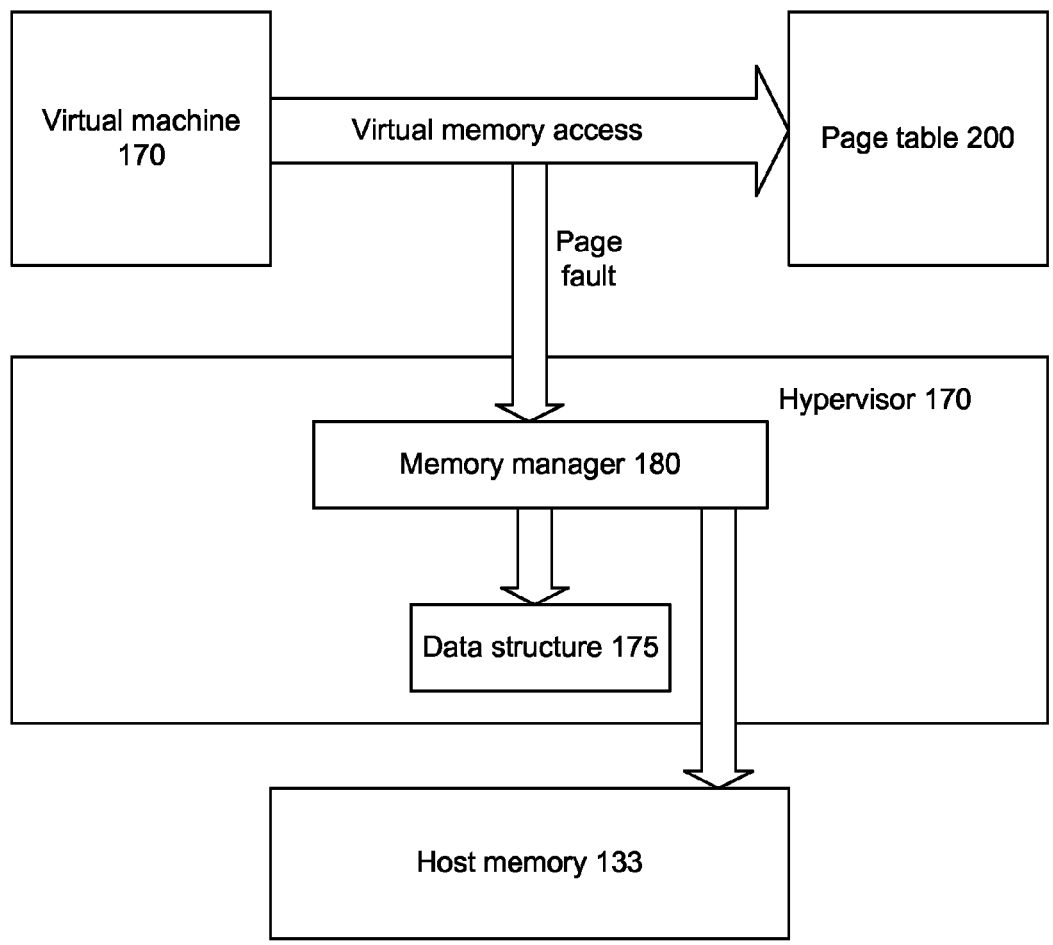
FIG. 2 schematically illustrates an example of tracking transformed memory pages in virtual machine chain migration in virtual machine live migration, in accordance with one or more aspects of the present disclosure.

When the memory page is eventually accessed by the virtual machine, the hypervisor may intercept the page fault or the memory protection fault triggered by the memory page access attempt and look up in data structure 175 the address of the memory page being accessed, as schematically illustrated by FIG. 2. The hypervisor may then retrieve from data structure 175 the host memory address of the corresponding transformed memory block, and perform the reverse transformation of at least part of the memory block containing the memory page, e.g., by uncompressing and/or decrypting the memory block. Upon performing the reverse transformation, the hypervisor may store the resulting one or more memory pages in the host memory. The hypervisor may then map the guest address of the memory page being accessed by the virtual machine to the host address where the memory page has been stored, and set the valid bit of the page table entry corresponding to the memory page. Upon return from the hypervisor call triggered by the page fault or the memory protection fault, the virtual machine may complete the memory access operation.

The hypervisor may track memory page modifications by the virtual machines. In an illustrative example, the hypervisor may, for each transformed memory block, keep track of modified memory pages that have been produced by reverse-transforming the memory block. Upon determining that the number of modified memory pages associated with a particular transformed memory block exceeds a predetermined or dynamically determined threshold value, the hypervisor may discard the whole transformed memory block. In an illustrative example, the threshold value may correspond to at least 50% of the total number of the memory pages contained by the memory block.

When the virtual machine is later migrated to a new destination host, the origin hypervisor may first transmit the remaining (i.e., non-discarded) transformed memory blocks, and then transmit the modified memory pages. The latter may be grouped and/or transformed before the transmission.

Various aspects of the above referenced methods and systems are described in details herein below by way of examples, rather than by way of limitation.

Figure 3:
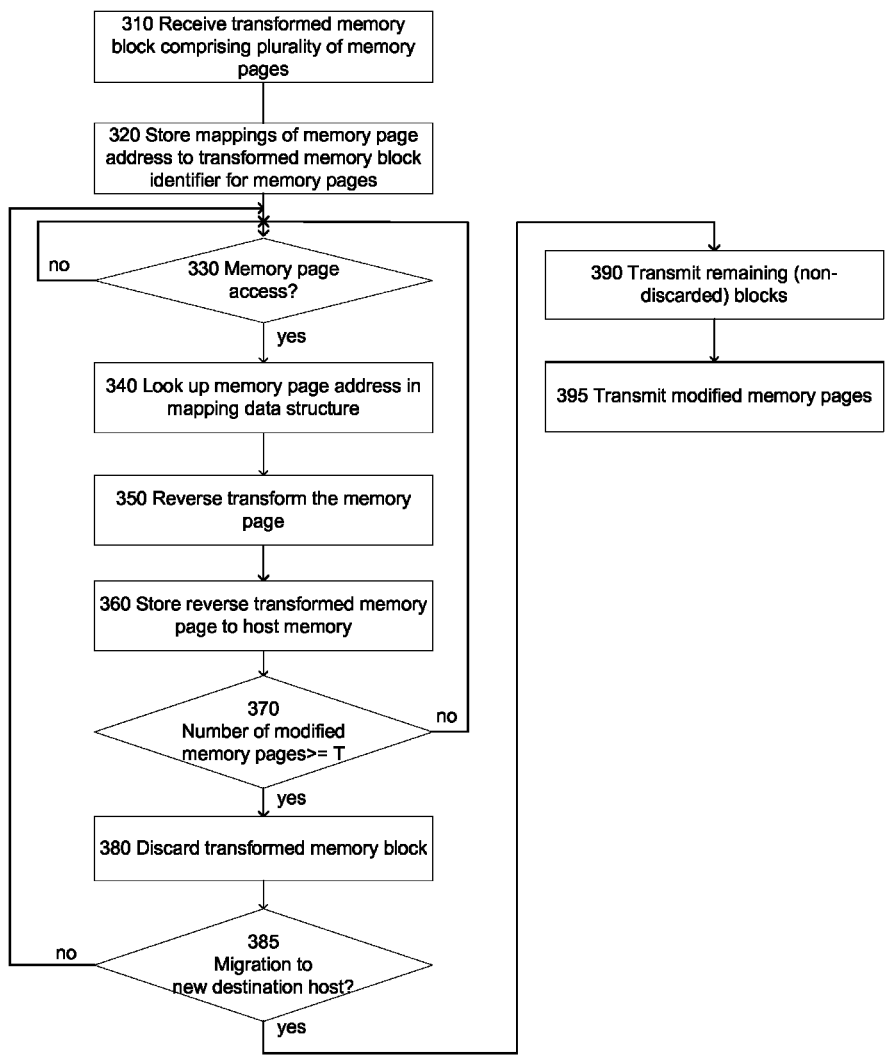
FIG. 3 schematically illustrates a flow diagram of an example method for tracking transformed memory pages in virtual machine chain migration, in accordance with one or more aspects of the present disclosure.

FIG. 3 depicts a flow diagram of an example method 300 for tracking transformed memory pages in virtual machine chain migration. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its individual functions, routines, subroutines, or operations may be performed by one or more processors of the computer system executing the method (e.g., computer system 100B of FIG. 1). In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the destination hypervisor may receive, via a network communication interface, one or more transformed (e.g., compressed, encrypted, and/or encoded) memory blocks, each comprising one or more virtual machine memory pages. Responsive to receiving each transformed memory block, the hypervisor may store the transformed memory block in the host memory.

At block 320, the hypervisor may store in the host memory, for each memory page contained by a transformed memory block, a mapping of the memory page address to the identifier of the transformed memory block stored in the host memory, without performing the reverse transformation of the transformed memory block. Each mapping record may further comprise the memory page offset within the memory block. In certain implementations, the destination host migration agent may further clear the valid bit of one or more page table entries corresponding to the memory pages contained by the memory block, so that an attempt to access the corresponding memory page would trigger a page fault intercepted by the hypervisor. Alternatively, the destination host migration agent may further clear the writable bit of the page table entry corresponding to the virtual memory page, so that an attempt to access the memory page would trigger a memory protection fault which may be intercepted by the hypervisor.

Responsive to detecting, at block 330, an access to the memory page by the virtual machine, the hypervisor may, at block 340, retrieve the host memory address of the transformed memory block corresponding to the memory page being accessed, by looking up the address of the memory page being accessed in the memory mapping data structure.

At block 350, the hypervisor may perform the reverse transformation of the memory block, e.g., by uncompressing and/or decrypting the memory block.

At block 360, the hypervisor may store the resulting one or more memory pages in the host memory. In certain implementations the hypervisor may further modify the page table entry corresponding to the memory page to map the guest address of the memory page to the host memory address, and set the valid bit of the page table entry corresponding to the memory page.

Responsive to determining, at block 370, that the number of modified memory pages belonging to a particular transformed memory block exceeds a pre-determined or dynamically determined threshold value, the hypervisor may, at block 380, discard the transformed memory block Responsive to initiating, at block 385, a migration procedure of the virtual machine to a new destination host, the hypervisor may, at block 390, transmit the remaining (non-discarded) transformed memory blocks.

At block 395 the hypervisor may transmit the modified memory pages. In certain implementations, the modified memory pages may be grouped and/or transformed before the transmission (e.g., by a compression, encryption, and/or encoding function).

Figure 4:
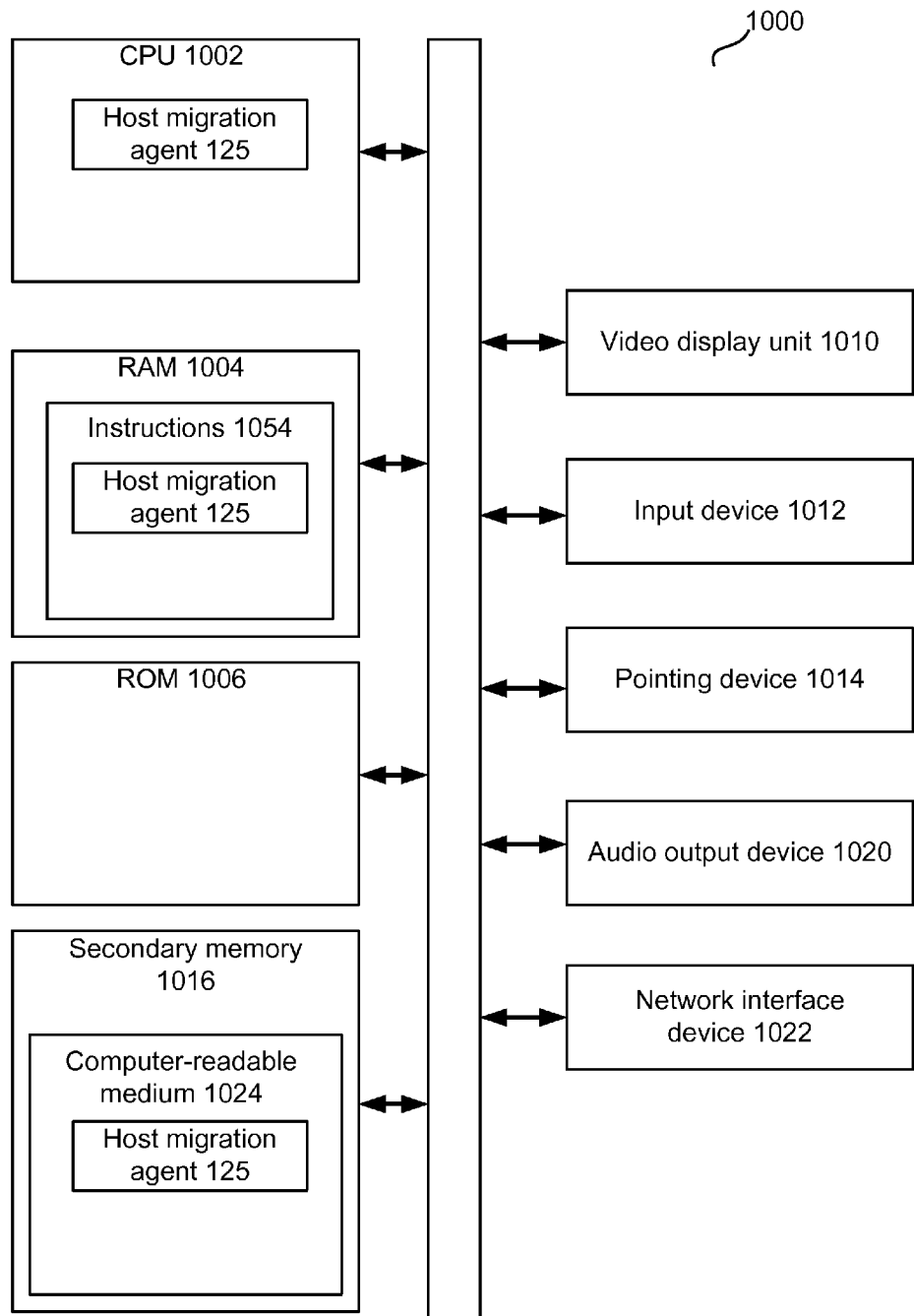
FIG. 4 schematically illustrates a block diagram of an illustrative computer system operating in accordance with the examples of the present disclosure.

FIG. 4 depicts an example computer system 1000 within which a set of instructions, for causing the computer system to perform any one or more of the methods described herein, may be executed. In certain implementations, computer system 1000 may correspond to computer system 100A, 100B of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may comprise a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further comprise a network interface device 1022. Computer system 1000 also may comprise a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may comprise a non-transitory computer-readable storage medium 1024 on which may be stored instructions of host migration agent 125 implementing method 300 for tracking transformed memory pages in virtual machine chain migration. Instructions of host migration agent 125 may also reside, completely or partially, within the main memory 1004 and/or within processor 1002 during execution thereof by computer system 1000, hence, main memory 1004 and processor 1002 may also constitute machine-readable storage media.

While computer-readable storage medium 1024 is shown in the illustrative embodiment as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

The invention claimed is:

1. A method, comprising:
  receiving, by a processor, a transformed memory block comprising a memory page mapped into an address space of a virtual machine being migrated to a computer system associated with the processor;
  clearing, in a page table entry of a page table associated with the virtual machine, a valid bit associated with the memory page, wherein the valid bit reflects presence of the memory page in a physical memory frame referenced by the page table entry;
responsive to detecting an access to the memory page, performing a reverse transformation of at least part of the transformed memory block, to produce contents of the memory page;
storing, in a memory, the contents of the memory page;
detecting a modification of the memory page by the virtual machine; and
responsive to determining, by the processor, that a number of modified memory pages comprised by the transformed memory block exceeds a threshold value, discarding the transformed memory block.

2. The method of claim 1, wherein the transformed memory block is provided by at least one of: a compressed memory block, an encrypted memory block, or an encoded memory block.

3. The method of claim 1, further comprising:
responsive to determining that the number of modified memory pages associated with the transformed memory block does not exceed the threshold value, transmitting the transformed memory block to a second computer system.

4. The method of claim 3, further comprising:
transmitting the modified memory pages to the second computer system.

5. The method of claim 1, wherein receiving the transformed memory block further comprises:
storing, in a memory data structure, a mapping comprising an address of the memory page and an identifier of the transformed memory block.

6. The method of claim 5, wherein the identifier of the transformed memory block comprises an address of the transformed memory block in the memory of the computer system.

7. The method of claim 1, wherein detecting the modification of the memory page by the virtual machine comprises intercepting one of: a page fault or a memory protection fault.

8. The method of claim 1, further comprising:
clearing, in the page table entry, a writable bit associated with the memory page, wherein the writable bit reflects write access to the memory page.

9. A computer system, comprising:
a memory; and
a processor, operatively coupled to the memory, to:
receive a transformed memory block comprising a memory page mapped into an address space of a virtual machine being migrated to the computer system;
clear, in a page table entry of a page table associated with the virtual machine, a valid bit associated with the memory page, wherein the valid bit reflects presence of the memory page in a physical memory frame referenced by the page table entry;
responsive to detecting an access to the memory page, perform a reverse transformation of at least part of the transformed memory block, to produce contents of the memory page;
store, in the memory, the contents of the memory page;
detect a modification of the memory page by the virtual machine; and
responsive to determining that a number of modified memory pages comprised by the transformed memory block exceeds a threshold value, discard the transformed memory block.

10. The system of claim 9, wherein a transformed memory block is provided by at least one of: a compressed memory block, an encrypted memory block, or an encoded memory block.

11. The system of claim 9, wherein the processor is further to:
responsive to determining that the number of modified memory pages associated with the transformed memory block does not exceed the threshold value, transmit the transformed memory block to a second computer system.

12. The system of claim 11, wherein the processor is further to:
transmit the modified memory pages to the second computer system.

13. The system of claim 9, wherein to receive the transformed memory block, the processor is further to:
store, in a memory data structure, a mapping comprising an address of the memory page and an identifier of the transformed memory block.

14. The system of claim 9, wherein the processor is further to:
clear, in the page table entry, a writable bit associated with the memory page, wherein the writable bit reflects write access to the memory page.

15. A computer-readable non-transitory storage medium comprising executable instructions that, when executed by a processor, cause the processor to:
receive, by the processor, a transformed memory block comprising a memory page mapped into an address space of a virtual machine being migrated to a computer system associated with the processor;
clear, in a page table associated with the virtual machine, a valid bit associated with the memory page, wherein the valid bit reflects presence of the memory page in a physical memory frame referenced by the page table entry;
responsive to detecting an access to the memory page, perform a reverse transformation of at least part of the transformed memory block, to produce contents of the memory page;
store, in a memory, the contents of the memory page;
detect a modification of the memory page by the virtual machine; and
responsive to determining, by the processor, that a number of modified memory pages comprised by the transformed memory block exceeds a threshold value, discard the transformed memory block.

16. The computer-readable non-transitory storage medium of claim 15, wherein a transformed memory block is provided by at least one of: a compressed memory block, an encrypted memory block, or an encoded memory block.

17. The computer-readable non-transitory storage medium of claim 15, further comprising executable institutions to cause the processor to:
responsive to determining that the number of modified memory pages associated with the transformed memory block does not exceed the threshold value, transmit the transformed memory block to a second computer system.

18. The computer-readable non-transitory storage medium of claim 17, further comprising executable institutions to cause the processor to:
transmit the modified memory pages to the second computer system.

19. The computer-readable non-transitory storage medium of claim 15, wherein executable instructions causing the processor to receive the transformed memory block further comprise executable instructions to cause the processor to:
  storing, in a memory data structure, a mapping comprising an address of the memory page and an identifier of the transformed memory block.

20. The computer-readable non-transitory storage medium of claim 15, further comprising executable institutions to cause the processor to:
  clear, in the page table entry, a writable bit associated with the memory page, wherein the writable bit reflects write access to the memory page.

* * * * *